United States Patent
Singh et al.

(10) Patent No.: US 11,755,473 B2
(45) Date of Patent: Sep. 12, 2023

(54) METHOD AND SYSTEM FOR MANAGING MEMORY LEAKS IN A LINEAR MEMORY MODEL

(71) Applicant: SAMSUNG ELECTRONICS CO., LTD., Suwon-si (KR)

(72) Inventors: Surendra Singh, Bengaluru (IN); Dinesh Gehlot, Bengaluru (IN); Mallikarjun Shivappa Bidari, Bengaluru (IN); Raju Udava Siddappa, Bengaluru (IN); Shashank Vimal, Bengaluru (IN); Shreya Ganatra, Bengaluru (IN); Sujay Shankar Gaitonde, Bengaluru (IN); Tushar Vrind, Bengaluru (IN); Venkata Raju Indukuri, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/848,716

(22) Filed: Jun. 24, 2022

(65) Prior Publication Data
US 2023/0214321 A1      Jul. 6, 2023

(30) Foreign Application Priority Data

Jan. 3, 2022    (IN) .............................. 202241000152

(51) Int. Cl.
*G06F 12/00*    (2006.01)
*G06F 12/02*    (2006.01)
(Continued)

(52) U.S. Cl.
CPC ........ *G06F 12/0253* (2013.01); *G06F 9/3004* (2013.01); *G06F 9/321* (2013.01); *G06F 12/0238* (2013.01)

(58) Field of Classification Search
CPC ............. G06F 12/0253; G06F 12/0238; G06F 9/3004; G06F 9/321; G06F 3/0608;
(Continued)

(56) References Cited

U.S. PATENT DOCUMENTS 7,434,105 B1    10/2008    Rodriquez-Rivera et al.
7,624,137 B2    11/2009    Bacon et al.
(Continued)

FOREIGN PATENT DOCUMENTS

CN           111352734          6/2020

OTHER PUBLICATIONS

David F. Bacon, et al., "Garbage Collection for Embedded Systems", EMSOFT 2004, Sep. 27-29, Pisa, Italy.
(Continued)

*Primary Examiner* — Shawn X Gu
(74) *Attorney, Agent, or Firm* — F. Chau & Associates, LLC (57) ABSTRACT

A method for managing memory leaks in a memory device includes grouping, by a garbage collection system, a plurality of similar memory allocations of the memory device into one or more Unique Fixed Identifiers (UFIs); identifying, by the garbage collection system, one of the one or more UFIs having a highest accumulated memory size and adding each of the plurality of memory allocations in the identified one of the one or more UFIs into a Potential Leak Candidate List (PLCL); identifying, by the garbage collection system, the memory leaks in the memory device by identifying unreferenced memory addresses associated with the plurality of memory allocations in the PLCL; and releasing, by the garbage collection system, the identified unreferenced memory addresses associated with the plurality of memory allocations corresponding to the memory leaks into the memory device.

20 Claims, 5 Drawing Sheets

(51) Int. Cl.
  *G06F 9/30* (2018.01)
  *G06F 9/32* (2018.01)
(58) Field of Classification Search
  CPC ........... G06F 3/0652; G06F 2212/1044; G06F 2212/702; G06F 2212/7205
  See application file for complete search history.

(56) References Cited

U.S. PATENT DOCUMENTS

| | | | |
|---|---|---|---|
| 8,429,620 B2* | 4/2013 | Chen | G06F 11/3636 714/42 |
| 10,802,765 B2 | 10/2020 | Mangione-Tran | |
| 2006/0095427 A1 | 5/2006 | Dickenson | |
| 2009/0198943 A1 | 8/2009 | Yahagi | |

OTHER PUBLICATIONS

Yang Chang, "Garbage Collection for Flexible Hard Real-Time Systems", Oct. 2007 (Submitted for the degree of Doctor of Philosophy—University of York, Department of Computer Science).

Martin Kero, et al., "Timber as an RTOS for Small Embedded Devices", Jan. 2005, (Lulea University of Technology, Department of Computer Science and Electrical Engineering, EISLAB,Lulea, Sweden).

* cited by examiner

METHOD AND SYSTEM FOR MANAGING MEMORY LEAKS IN A LINEAR MEMORY MODEL

CROSS-REFERENCE TO RELATED APPLICATION

This application claims priority under 35 U.S.C. § 119 to Indian Patent Application No 202241000152 filed on Jan. 3, 2022, in the Indian Intellectual Property Office, the disclosure of which is incorporated by reference herein in its entirety.

TECHNICAL FIELD

The present disclosure relates generally to flat/linear memory models of embedded systems, and more particularly to methods and systems for managing memory leaks in a linear memory model.

DISCUSSION OF THE RELATED ART

In a linear/flat memory model, any thread or task or function can directly address any memory location, with very minor or no restrictions. User applications will have pointers that directly point to physical memories of the system. The mapping of virtual memory to physical memory locations is also maintained one-to-one. Thus, the user applications can easily access memory region allocated or associated with other applications via known methods of inter-task communication or Inter Process Communication (IPC).

In some cases, memory may be allocated but not freed in systems without automatic garbage collection. This may result in a memory leak, which can cause a system or application to run out of memory or crash. Garbage collection may not be feasible in large, linearly modeled memory systems, as there may be significant system overhead. Accordingly, there is a need in the art for managing memory leaks in linear memory models.

SUMMARY

Disclosed herein is a method for managing memory leaks in a linear memory model. The method includes grouping, by a garbage collection system, a plurality of similar memory allocations of the memory device into one or more Unique Fixed Identifiers (UFIs); identifying, by the garbage collection system, one of the one or more UFIs having a highest accumulated memory size and adding each of the plurality of memory allocations in the identified one of the one or more UFIs into a Potential Leak Candidate List (PLCL); identifying, by the garbage collection system, the memory leaks in the memory device by identifying unreferenced memory addresses associated with the plurality of memory allocations in the PLCL; and releasing, by the garbage collection system, the identified unreferenced memory addresses associated with the plurality of memory allocations corresponding to the memory leaks, into the memory device.

The present disclosure also provides a garbage collection system for managing memory leaks in a linear memory model. The garbage collection system includes a processor and a memory. The memory is communicatively coupled to the processor and stores processor-executable instructions, which on execution, cause the processor to group a plurality of similar memory allocations of a memory device into one or more Unique Fixed Identifiers (UFIs). Further, the instructions cause the processor to identify one of the one or more UFIs having the highest accumulated memory size and to add each of the plurality of memory allocations in the identified one of the one or more UFIs into a Potential Leak Candidate List (PLCL). The instructions further cause the processor to identify the memory leaks in the memory device by identifying unreferenced memory addresses associated with the plurality of memory allocations in the PLCL. The instructions further cause the processor to release the memory allocations, corresponding to the memory leaks, into the memory device, thereby managing the memory leaks in the memory device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate example embodiments and, together with the description, explain the disclosed principles, in which.

DETAILED DESCRIPTION

In general, memory management functions like 'malloc' and 'free' are used for allocating a memory region from a heap and freeing the allocated memory back to the heap, respectively. A memory leak happens when the memory is allocated but not freed, even at the end/completion of the application. Such memory leaks may be identified and handled by Garbage Collectors (GCs). However, the GCs have to search for references to memory pointers in all the memory areas of the system, where a reference can be stored as a variable like a global variable (in data section), a local variable (in stack section) and a local or global variable (in heap section, when allocated from a memory manager, or partitioning of common memory area). For example, in that last case, the reference and its corresponding object may both be stored in the heap section.

Moreover, since the pointers are not thread specific in flat memory model, a pointer can belong to any thread, and hence the GCs have to search in all heap, data and stack of all the threads in the system, which is called as the 'search space' for the GC. Scanning through the search space is a time intensive operation of the order of K×M, where there are 'K' unfree memory allocations, and in a total memory of size 'M' Bytes (areas including global, stack and heap regions). Thus, application of GCs in the flat/linear memory models often requires optimization techniques to reduce the time intensive operation and to apply the operation in embedded systems which are resource constrained. Embedded systems may include custom processors, chipsets, and operating code suited to a specific task, and may therefore be designed for efficient use of relatively sparse resources.

Due to the memory and processing overheads resulting from the GCs and due to unpredictable delays from 'malloc' and 'free' operations, GCs are not generally used in the embedded systems. On the other hand, in the embedded systems, 'allocation' of memory and 'freeing/releasing' of memory are controlled by the programmers. However, when the programmer writes a faulty program having memory allocation, but no corresponding free/release function, such program will lead to memory leaks. These memory leaks get accumulated overtime and lead to system running out of memory and/or system crash.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, regardless of whether such computer or processor is explicitly shown.

While the disclosure may be modified variously and be implemented in alternative forms, specific embodiments thereof have been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

The present disclosure relates to a method and a garbage collection system for managing memory leaks in a linear memory model. In a linear memory model, memory is organized in a single contiguous address space. This allows the system to access the memory directly when given an address, or to iterate over multiple addresses to access the memory linearly. In an embodiment, the proposed method identifies the memory leaks with the help of a Unique Fixed Identifier (UFI), which identifies a unique allocation of a memory. As an example, the UFI may include a combination of parameters such as, without limitations, filename, line number, length/size, Link Register/Program Counter (LR/PC—address of malloc caller) with size or some range of stack address or any other similar parameter, which may be used to represent a collection of similar memory allocations. The UFI is used to find a pattern of repeated memory allocations, which are not getting freed over time. Also, access information may be used to detect memory, which is still under use, thereby reducing a number of pointers which will be searched for references. Further, from the identified leaks, a method is defined regarding where the expected references can be searched for. Defining the 'where to search' space greatly reduces the amount of memory searched. Finally, the detected memory leaks are freed to prevent or delay system crashes during user activity. Also, the leak information may be saved across power cycles for quicker identification and release of leaks in the future instances.

In an embodiment, the proposed method aims to detect repeated memory leaks during runtime of an application or a task and perform analysis of identified memory leaks from their birth. The system may inform programmers with, for example, soft warnings of possible memory leaks during development of an application. Eventually, the proposed method frees leaked memories in the systems, to reduce possible crashes to the system. The memory leak detection may be performed offline as well, on available system dumps, in which case the identified leaks may be fixed in, for example, a subsequent software release.

In the following detailed description of the embodiments of the disclosure, references are made to the accompanying drawings that form a part thereof, and in which specific embodiments of the disclosure are shown by way of illustration. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
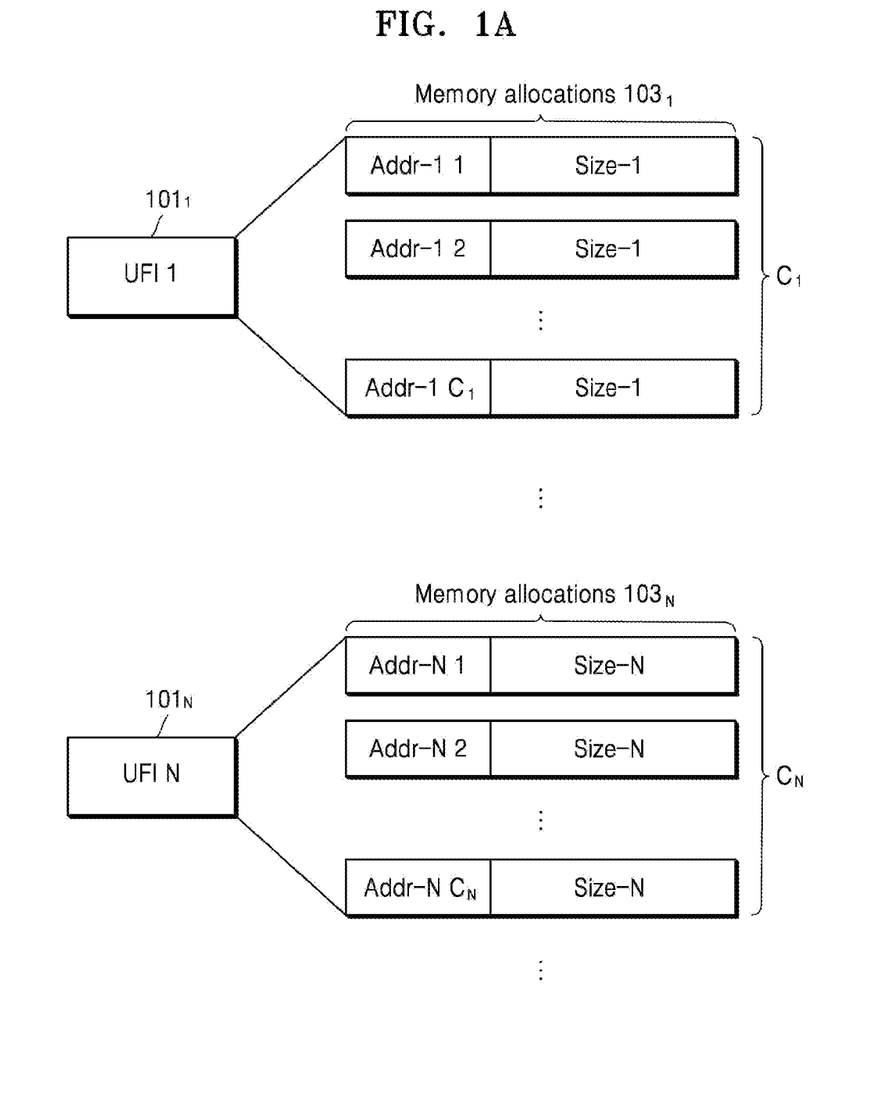
FIG. 1A illustrates grouping of memory allocations into one or more Unique Fixed Identifiers (UFIs) in accordance with some embodiments of the present disclosure.

FIG. 1A illustrates grouping of memory allocations 103 into one or more Unique Fixed Identifiers (UFIs) 101 in accordance with some embodiments of the present disclosure.

In an embodiment, a plurality of memory allocations 103 may be associated with a linear memory model. The plurality of memory allocations 103 may be used for reserving a partial or a complete portion of a memory unit for execution of programs, processes and tasks. The memory unit may be, for example, a memory device including a non-transitory storage. When the memory allocations 103 are created for reserving some portion of memory for a process, but is not eventually released/freed after the process has completed its execution, such memory allocations 103 cause memory leaks in the memory unit. The present disclosure aims to manage and recover the memory leaks by grouping the plurality of memory allocations 103 into one or more unique sets of memory allocations 103 called Unique Fixed Identifiers (UFIs) 101, and then analysing each of the one or more UFIs 101.

In an embodiment, such as the one shown in FIG. 1A, the plurality of memory allocations $103_1, \ldots, 103_N$ (also collectively referred as memory allocations 103) may be grouped into a one or more UFIs $101_1, \ldots, 101_N$ (also collectively referred as UFIs 103). As an example, the plurality of memory allocations 103 may be grouped based on a similarity among each of the plurality of memory allocations 103, which may be determined with the help of one or more UFI parameters. As an example, the UFI parameters may include, without necessarily being limited to, a filename of the memory allocation, a line number corresponding to the memory allocation, size of the memory allocation, predefined range of memory stack addresses and Link Register (LR) or Program Counter (PC) associated with a MALLOC caller corresponding to the memory allocation. In an embodiment, values of these UFI parameters may be assigned and/or created when a memory allocation is being created (for example, using the MALLOC function) for reserving a required portion of the memory. Thus, the UFI parameters help in identifying a pattern in the memory allocations 103, which may be used for determining the similarity among the plurality of memory allocations 103 and for eventually grouping them into the one or more UFIs 101.

In the example grouping illustrated in FIG. 1A, the plurality of memory allocations 103 are grouped based on memory stack addresses and memory size of the plurality of memory allocations 103. That is, each of the memory allocations 103 having a memory size 'Size-1' and having a stack address in the range of Addr-11, Addr-12, Addr-1C$_1$ may be grouped into a single UFI—'UFI 1' 101$_1$. At the end of grouping, the UFI 1 101$_1$ may have 'C$_1$' number of memory allocations 103, which are similar in terms of their memory stack addresses and memory size Similarly, the plurality of memory allocations 103 that are not grouped and/or associated to the 'UFI 1' may be grouped into one or more other UFIs (UFI 1 101$_1$, . . . , UFI N 101$_N$) based on the same or other similarities among the plurality of memory allocations 103.

In an embodiment, after grouping each of the plurality of memory allocations 103 into one or more UFIs 101, the method may calculate an accumulated memory size 'S$_i$' of each of the one or more UFIs 101. As an example, the accumulated memory size of the UFI$_1$ may be calculated by adding the memory size of all the memory allocations 103$_1$ grouped under UFI$_1$. Once the accumulated memory size of each of the one or more UFIs 101 is determined, one of the UFIs 101 having the highest accumulated memory size may be selected. Further, each of the plurality of memory allocations 103 grouped in the selected UFI 101 may be added to a Potential Leak Candidate List (PLCL) for further analysis. In an alternative embodiment, other parameters such as, for example, the count 'C$_i$' of memory allocations 103 in each of the one or more UFIs 101 or a value (S$_i$×C$_i$) may be used as criteria for selecting the UFI, whose memory allocations 103 need to be added to the PLCL. In other words, the PLCL includes the plurality of memory allocations 103, which are most likely to be causing a memory leak in the memory unit.

In an embodiment, after obtaining the PLCL, each of the plurality of memory allocations 103 in the PLCL may be analysed to identify one or more unreferenced memory addresses corresponding to the plurality of memory allocations 103. An unreferenced memory address may correspond to a memory portion which has been reserved but not used and/or is inactive. In other words, the unreferenced memory addresses point to the inactive portions of memory, which are reserved by the corresponding memory allocations 103, and which are not actively being used by any active process/task in the system, causing a leak in the memory unit. Subsequently, each of the plurality of memory allocations 103 that correspond to the unreferenced memory addresses and/or memory leaks may be released into pool of free memory, thereby recovering the memory leaks in the memory unit.

In an embodiment, if none of the memory allocations 103 in the PLCL point to an unreferenced memory address, then the PLCL may be replaced with a new or updated set of plurality of memory allocations 103 that are grouped in a UFI 101 having next highest accumulated memory size. The above process may be continued until a predefined threshold memory size is available and/or is freed up for normal functioning of the system. As an example, the monitoring process may be stopped when a 40% of the total system memory is available for various functions of the system. Alternatively, the monitoring process may be stopped when a maximum number of iterations of monitoring are complete. As an example, the monitoring process may be stopped after scanning/analysing five UFIs 101 in a decreasing order of their accumulated memory sizes.

Figure 1B:
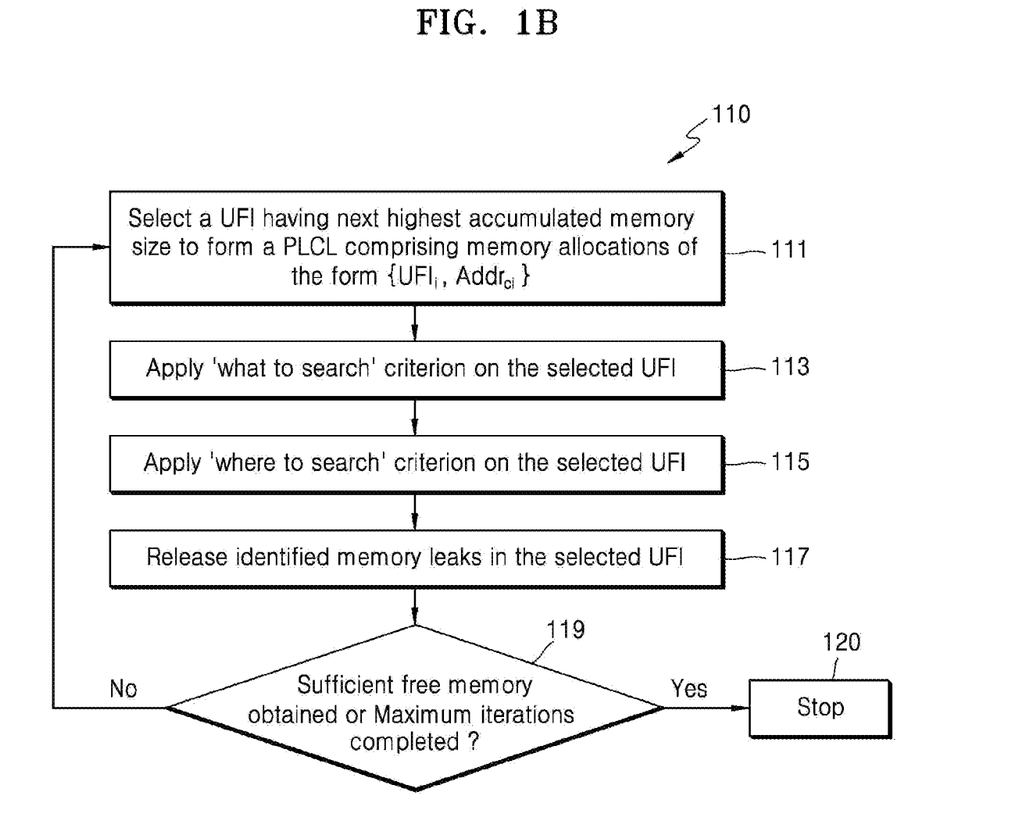
FIG. 1B is a flowchart that illustrates a method of monitoring the memory model for managing memory leaks in accordance with some embodiments of the present disclosure.

FIG. 1B is a flowchart that illustrates a method 110 of monitoring the memory model for managing memory leaks in accordance with some embodiments of the present disclosure.

In an embodiment, at step 111 of the method 110, a UFI 101 having the highest accumulated memory size may be selected for creating a PLCL. The created PLCL may include a plurality of memory allocations belonging to the UFI$_i$ and having a memory address of Addr$_{ci}$, and may be represented by the tuple {UFI$_i$, Addr$_{ci}$}.

Subsequently, at step 113, the method 110 involves optimizing the search space with the application of 'what to search' criteria. In other words, the 'what to search' criterion helps in identifying the set of memory references which should be scanned/searched for identifying the memory leaks.

Suppose if there are 'N' UFIs with some un-freed memory allocations, then the optimized search space (K) may be reduced to N' UFIs, where N'<N, such that the expression (1) below is satisfied:

$$\sum_{i=1}^{i=N} C_i = K \quad (1)$$

where 'C$_i$' represents the count or number of times the memory is allocated and un-freed for an 'ith' UFI in the memory model, based on the example criteria of memory allocations belonging to a UFI described above.

Further, the size for every memory allocation by the UFI$_i$ may be denoted by 'S$_i$', which is unique memory location given by 'Addr$_{ci}$', as there are C$_i$ counts. Thus, the total un-freed memory allocation may be computed using the expression (2) below:

$$\sum_{i=1}^{i=N} C_i \times S_i \quad (2)$$

In an embodiment, by virtue of reducing N to N', even 'K' may reduce to K'. Consequently, the optimized 'where to search' space requires the garbage collector to scan through the lesser number of counts C'$_i$, for each 'ith' UFI in the memory model, such that the C'$_i$<C$_i$.

At step 115, the search space may be further reduced/optimized by applying the 'where to search' criterion on the optimized search space obtained in step 113. In an embodiment, the 'where to search' criterion indicates where the above N' or N UFI references amongst the C' or C count are searched. That is, as an example, if there are 'M' Bytes of memory areas (including global, stack and heap memory areas), the optimized search space may include only M' bytes of areas, where M'<M. Consequently, the net search time taken by the garbage collection system may be reduced as indicated in expression (3) below:

$$\left(\sum_{i=1}^{i=N'} C'_i\right) \times M' = (K' \times M') \ll (K \times M) = \left(\left(\sum_{i=1}^{N} C_i\right) \times M\right) \quad (3)$$

Once the search space for monitoring is optimized, the garbage collection system may identify the leaks in the memory unit by detecting a plurality of unreferenced memory allocations 103 in the optimized search space. Further, at step 117, the identified leaks are released. In an embodiment, this may be performed by making a system call, and the system call may go through an operating system layer in order to identify the allocated memory and release it based on an address and a size. Finally, at step 119, the method 110 checks whether the sufficient memory free memory has been obtained or whether the maximum iterations of scanning has been completed. When at least one of the above criteria is matched, the scanning process may be paused and/or stopped at step 120, until the free/available memory size once again reduces below a threshold size. On the other hand, when both the conditions at step 119 are not satisfied, the garbage collection system may continue with the scanning by selecting another UFI, having the next highest accumulated memory size. The present disclosure is not necessarily limited to one or both of these conditions, and other conditions may be set to determine whether the system should continue scanning additional UFIs. Thus, the method 110 ensures that the memory leaks are dynamically released, without affecting the runtime and/or the normal execution of processes/tasks on the system.

Figure 2:
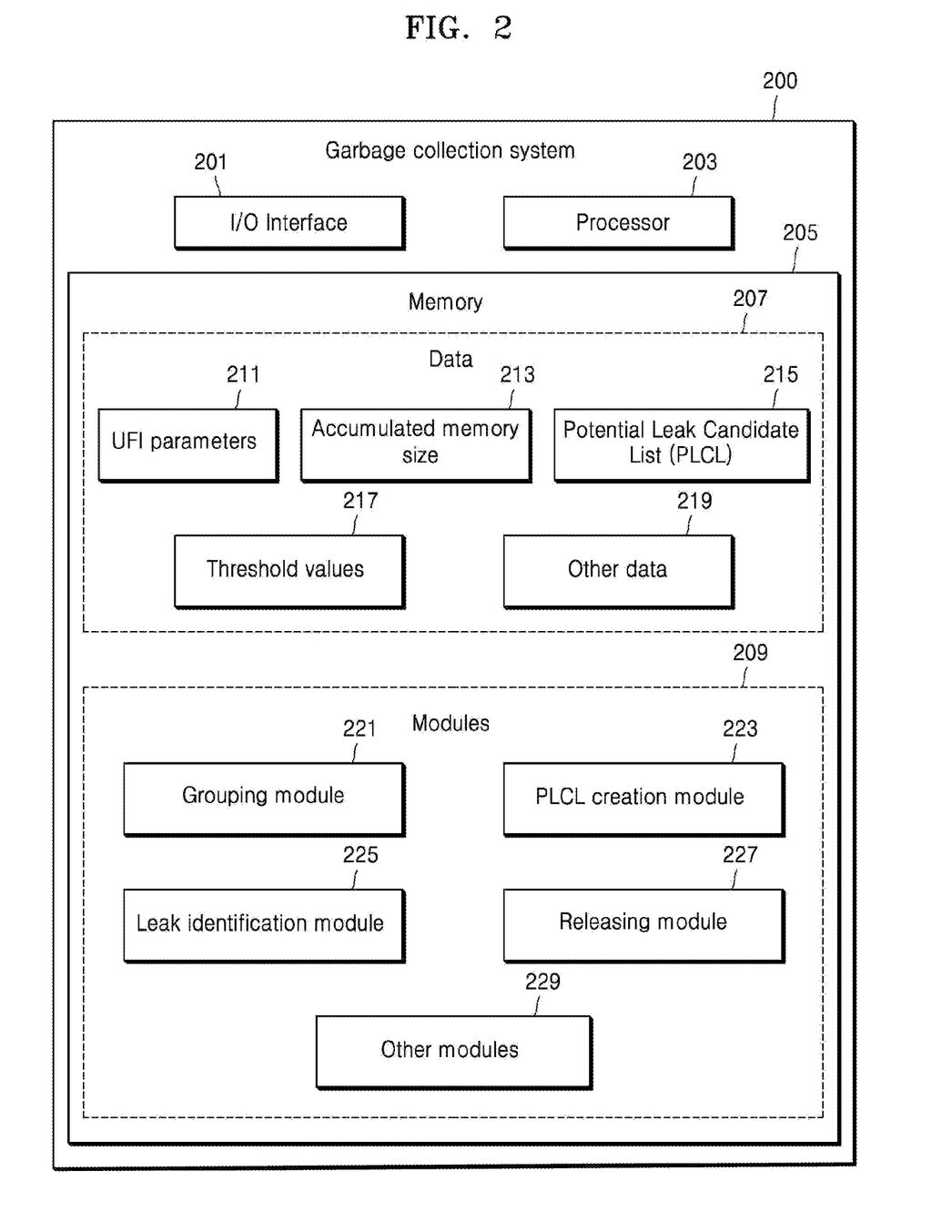
FIG. 2 is a detailed block diagram of a garbage collection system in accordance with some embodiments of the present disclosure.

FIG. 2 shows a detailed block diagram of a garbage collection system 200 in accordance with some embodiments of the present disclosure.

In an embodiment, the garbage collection system 200 may be configured within a memory controller of an embedded computing system having a linear/flat memory model, and may be configured for dynamically managing the memory leaks in a main memory of the embedded computing system. Alternatively, the garbage collection system 200 may be a standalone computing hardware, which may be associated with the embedded computing system in an ad-hoc manner, for initiating memory management only when necessary. In an implementation, it may be possible to modify the existing garbage collectors to function and/or perform one or more operations of the proposed garbage collection system 200.

In some implementations, the garbage collection system 200 may include an I/O interface 201, a processor 203 and a memory 205. The I/O interface 201 may be used for receiving one or more user inputs from a programmer or a user of a system in which the memory leaks need to be managed. The user inputs may be related to memory locations to be monitored, threshold values 217 for controlling the monitoring, and the like. Further, the I/O interface 201 may be used for communicatively interfacing the garbage collection system 200 with a secondary non-volatile memory for storing various information generated while managing the memory leaks on the system. This may include, for example, log data or configuration data. The memory 205 may be different from the main memory of the system and may be communicatively coupled to the processor 203 of the garbage collection system 200. In an embodiment, the memory 205 may store data 207 and one or more modules 209. The processor 203 may be configured to perform one or more functions of the garbage collection system 200 for managing memory leaks, using the data 207 and the one or more modules 209.

In an embodiment, the data 207 stored in the memory 205 may include, without limitation, one or more UFI parameters 211, an accumulated memory size 213, a Potential Leak Candidate List (PLCL) 215, threshold values 217 and other data 219. In some implementations, the data 207 may be stored within the memory 205 in the form of various data structures. Additionally, the data 207 may be organized using data models, such as relational or hierarchical data models. The other data 219 may include various temporary data and files generated by the one or more modules 209 while performing various functions of the garbage collection system 200.

In an embodiment, the one or more UFI parameters 211 are the parameters based on which of the plurality of memory allocations 103 may be grouped into one or more UFIs 101. As an example, the one or more UFI parameters 211 may include, without limitation, filename of the memory allocation, line number corresponding to the memory allocation, size of the memory allocation, predefined range of memory stack addresses and Link Register (LR) or Program Counter (PC) associated with a MALLOC caller corresponding to the memory allocation.

In an embodiment, the accumulated memory size 213 may indicate a total memory size of each of the plurality of memory allocations 103 grouped in a single UFI 101. That is, the accumulated memory size 213 of a UFI 101 may be computed by adding the memory size of each of the plurality of memory allocations 103 in the UFI. In an embodiment, the accumulated memory size 213 of the UFIs 101 may be used as a criterion for selecting a UFI 101 for scanning or analysing for managing the memory leaks in the memory unit. In an embodiment, the accumulated memory size 213 may include the total memory size of pluralities of memory allocations 103 in more than one UFI 101.

In an embodiment, the Potential Leak Candidate List (PLCL) 215 may be a virtual list of the plurality of memory allocations 103, which is created by adding the plurality of memory allocations 103 of the UFI 101 having highest accumulated memory size 213. The PLCL 215 may be temporary in nature and may be valid only during an on-going iteration of the memory management process. For example, the plurality of memory allocations 103 added in the PLCL 215 may be replaced and/or updated once the plurality of memory allocations 103 in the PLCL 215 are scanned and any unreferenced memory addresses or memory leaks are released.

In an embodiment, the threshold values 217 may include a threshold memory size that dynamically triggers initiation of the memory management process. As an example, the threshold memory size may be set as 40% of the total memory size of the system, such that the garbage collection system 200 dynamically initiates the memory management process when the free/available memory of the system reduces less than 40%. In an embodiment, the threshold values 217 may additionally include a threshold number of iterations, such as a number of iterations for selecting new UFIs to analyse. This threshold number may need to be performed before pausing and/or stopping the memory management process.

In an embodiment, the data 207 may be processed by the one or more modules 209 of the garbage collection system 200. In some implementations, the one or more modules 209 may be communicatively coupled to the processor 203 for performing one or more functions of the garbage collection system 200. In an implementation, the one or more modules 209 may include, without necessarily being limited to, a grouping module 221, a PLCL creation module 223, a leak identification module 225, a releasing module 227 and other modules 229.

As used herein, the term module may refer to an Application Specific Integrated Circuit (ASIC), an electronic circuit, a hardware processor (shared, dedicated, or group) and memory that is configured to execute one or more software or firmware programs, a combinational logic circuit, and/or other suitable components that provide the described functionality. In an implementation, each of the one or more modules 209 may be configured as stand-alone hardware computing units. In an embodiment, the other modules 229 may be used to perform various miscellaneous functionalities of the garbage collection system 200. It will be appreciated that such one or more modules 209 may be represented and/or its functionality implemented as a single module or a combination of different modules.

In an embodiment, the grouping module 221 may be configured to group the plurality of similar memory allocations 103 into one or more UFIs 101 based on analysis of the UFI parameters 211. In an embodiment, the PLCL creation module 223 may be configured for creating the PLCL 215 after identifying the UFI 101 with the highest accumulated memory size 213. In an embodiment, the leak identification module 225 may be configured to identify the memory leaks in the memory unit by detecting one or more unreferenced memory addresses corresponding to the plurality of memory allocations 103 in the PLCL 215. In an embodiment, the releasing module 227 may be configured to release the identified memory leaks back to the pool of free/unused memory.

In an embodiment, when there are on-going Inter Process Communications (IPCs) between threads (like RTOS threads) of the system, the memory address of the active memory pointers and their corresponding UFI 101 may be identified and used to further narrow down the search space for each UFI. For example, the memory address information from the IPCs and Application Programming Interfaces (APIs) may be considered as still active memory allocations and may be removed from the PLCL 215. This helps in further reducing/optimizing the "what to search" and "where to search" criteria.

In an embodiment, for further elimination of the UFIs 101 or count of the memory allocations 103 from the PLCL 215, the garbage collection system 200 may use HOT/COLD page information from a Memory Management Unit (MMU) of the system. As an example, if a memory pointer or memory address points to a HOT page (i.e., an active memory page), then the memory pointer may be considered as still active and can be removed from the PLCL 215. This helps in further reduction of the search space, which is already optimized by the 'what to search' criterion.

In an embodiment, to further enhance the speed of the search, the HOT/COLD page information may be used when the memory block address corresponding to a UFI 101 in the PLCL 215 is being searched as a memory leak. Here, a HOT page may be searched first so that the memory pointers are searched sooner, and the search can be stopped if the memory pointer is found in the HOT page. This is because, if the COLD page is searched first, then even the COLD page may become a HOT page, thereby increasing the search space. Thus, searching the HOT page first may further reduce of the 'where to search' portion of the search space.

In an embodiment, to take advantage of the HOT/COLD page information, the garbage collection system 200 may make use of extensions that are particularly designed in the system to collaborate the MMU and the garbage collection system 200, to fetch and store the accessed page history with time stamps, so that the garbage collection system 200 can consider the time stamps and treat a page as either HOT or COLD page.

In an embodiment, the information related to the UFI 101 with identified memory leaks for a given software binary may be stored across power cycles in non-volatile/secondary memory unit. Further, the information stored on the non-volatile memory may be reset with, for example Over-the-Top (OTT) software updates released for the software binary. Additionally, task-mapping information for each UFI 101 may be stored in the non-volatile memory to reduce the search space in the subsequent iterations.

In an embodiment, the garbage collection system 200 may perform the memory management process on debug files of the system, such as memory dumps, core dumps, JTAG bus and the like, to identify and report the memory leaks in the system. This memory leak report may be used by developers/programmers to fix the memory leaks in the future software updates.

In an embodiment, the operation of the garbage collection system 200 may be controlled by a programmer and/or user of the system on which the garbage collection system 200 is run. For example, the garbage collection system 200 may be executed on a lightly loaded core amongst all the available cores of a multicore processing system. Further, the garbage collection system 200 may be run when the system is in IDLE state or when the system is on an Aeroplane mode (APON). Various similar scenarios may be considered for executing the garbage collection system 200 when the system is not busy. Similarly, the operation of the garbage collection system 200 may be paused and/or blocked according to system peripheral input or other configured conditions such as when the system battery is low, system is working on low frequency or there are inputs/warnings from in-built system temperature sensors.

Figure 3:
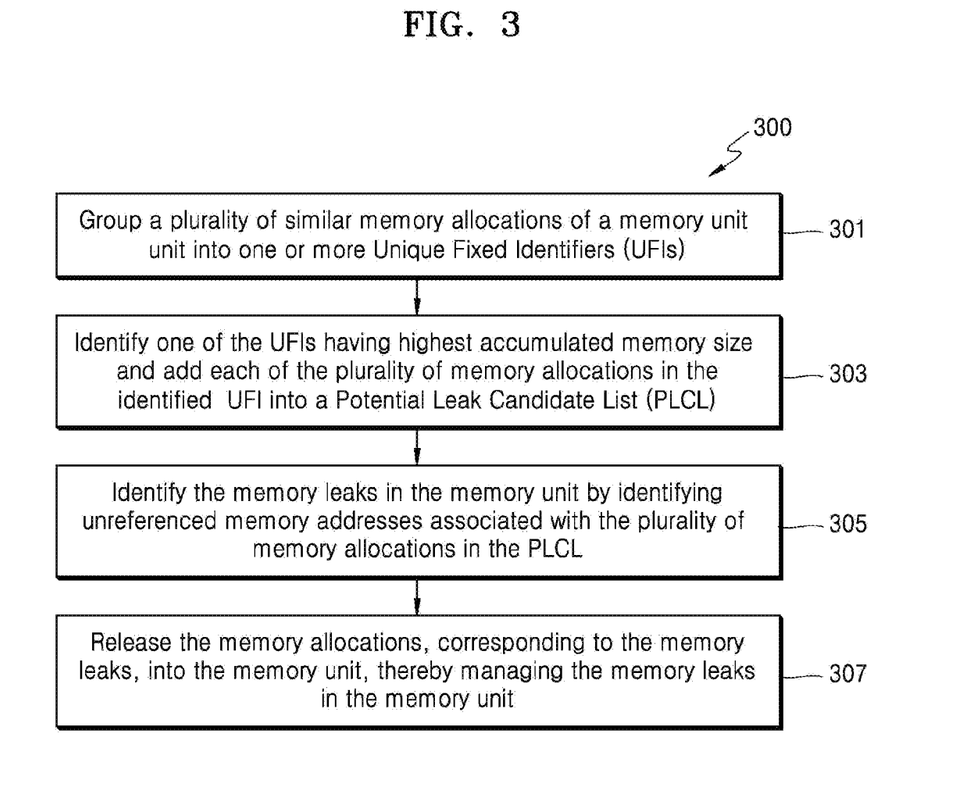
FIG. 3 is a flowchart that illustrates a method of managing memory leaks in a linear memory model in accordance with some embodiments of the present disclosure.

FIG. 3 is a flowchart that illustrates a method of managing memory leaks in a linear memory model in accordance with some embodiments of the present disclosure.

As illustrated in FIG. 3, the method 300 may include one or more blocks that illustrate a method for managing memory leaks in a linear memory model using a garbage collection system 200 illustrated in FIG. 2. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks may be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 includes grouping, by the garbage collection system 200, a plurality of similar memory allocations 103 of a memory unit into one or more Unique Fixed Identifiers (UFIs) 101. In an embodiment, the plurality of similar memory allocations 103 may be grouped into the one or more UFIs 101 based various parameters including at least one of—filename of the memory allocation, line number corresponding to the memory allocation, size of the memory allocation, predefined range of memory stack addresses and Link Register (LR) or Program Counter (PC) associated with a malloc caller corresponding to the memory allocation.

At block 303, the method 300 includes identifying, by the garbage collection system 200, one of the one or more UFIs 101 having highest accumulated memory size 213 and adding each of the plurality of memory allocations 103 in the identified one or more UFIs 101 into a Potential Leak Candidate List (PLCL) 215. In an embodiment, an alternative UFI 101 which has next highest accumulated memory size 213 may be selected and/or considered for identifying the memory leaks, when the identified one of the one or more UFIs 101 does not include any memory leaks. In a similar way, a plurality of successive UFIs 101 may be selected for identifying the memory leaks and releasing the memory allocations 103 corresponding to the memory leaks, until a predefined threshold memory size is available on the memory unit. As an example, the predefined threshold may be set based on the total size of the memory unit being monitored.

At block 305, the method 300 includes identifying, by the garbage collection system 200, the memory leaks in the memory unit by identifying unreferenced memory addresses associated with the plurality of memory allocations 103 in the PLCL 215. In an embodiment, identifying the memory leaks may include eliminating active memory addresses, which may correspond to a frequently used generic set of Application Programming Interface (API) parameters. Likewise, identifying the memory leaks may also include identifying the active memory addresses and the UFI 101 corresponding to the active memory addresses during an Inter Process Communication (IPC). This helps the garbage collection system 200 limit the search space of the UFI 101 to private memory blocks of processes involved in the IPC.

At block 307, the method 300 includes releasing, by the garbage collection system 200, the memory allocations 103 corresponding to the memory leaks, into the memory unit, thereby managing the memory leaks in the memory unit. In an embodiment, information related to each of the one or more UFIs 101 and the identified memory leaks may be stored in a non-volatile memory associated with the system being monitored. Storing the information on the non-volatile memory may help to identify potential memory leaks in the memory unit even during subsequent rebooting of the device or the system in which the garbage collection system 200 is configured.

In an embodiment, the information stored in the non-volatile memory may be reset as a result of a system update or a software update Also, in addition to the above information, process-mapping information corresponding to processes involved in the IPC may also be stored in the non-volatile memory. In an embodiment, the method of monitoring the memory unit for identifying and releasing the memory leaks may be initialized when the memory size available on the memory unit is less than a predetermined threshold.

Computer System

Figure 4:
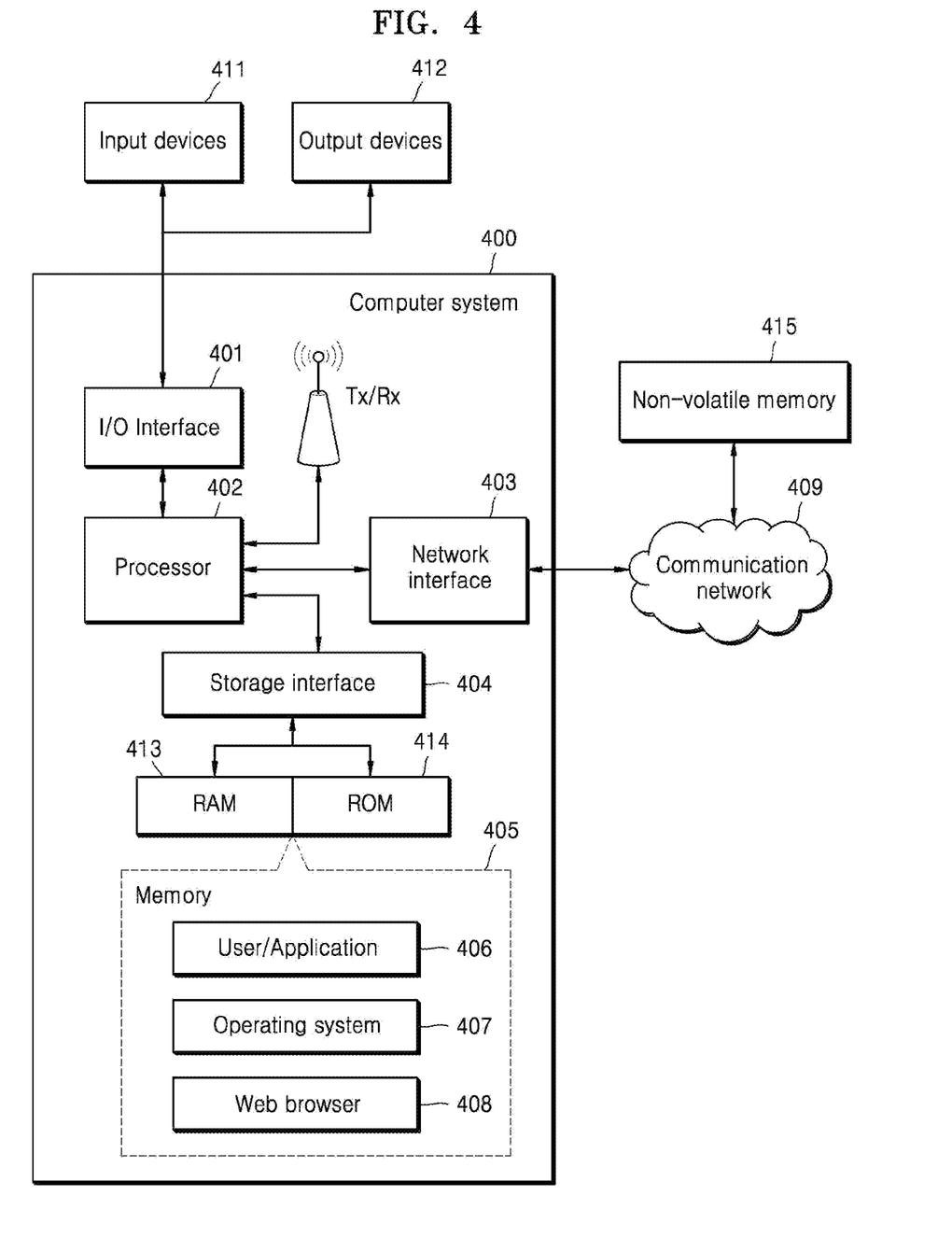
FIG. 4 is a block diagram of an example computer system for implementing embodiments consistent with the present disclosure.

FIG. 4 illustrates a block diagram of an example computer system 400 for implementing embodiments consistent with the present disclosure. In an embodiment, the computer system 400 may be the garbage collection system 200 illustrated in FIG. 2, which may be used for managing memory leaks in a linear memory model. The computer system 400 may include a central processing unit ("CPU" or "processor" or "memory controller") 402. The processor 402 may include at least one data processor for executing program components for executing user- or system-generated business processes. A user may include an application developer, a programmer, an organization or any system/sub-system being operated parallelly to the computer system 400. The processor 402 may include specialized processing units such as integrated system (bus) controllers, memory controllers/memory management control units, floating point units, graphics processing units, digital signal processing units, etc.

The processor 402 may communicate with one or more Input/Output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be communicate with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may connect with a non-volatile memory 415, which may be used to store information related to each of the one or more UFIs 101 and the identified memory leaks. Further, the non-volatile memory 415 may be used to store process-mapping information corresponding to processes involved in IPC. As an example, the non-volatile memory 415 may be a secondary memory device such as hard disk.

In an implementation, the communication network 409 may be implemented as one of the several types of networks, such as intranet or Local Area Network (LAN) and such within an organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the communication network 409 may include a variety of network devices, including routers, bridges, servers, computing devices, storage devices, etc.

In some embodiments, the processor 402 may be communicate with a memory 405 (e.g., RAM 413, ROM 414, etc. as shown in FIG. 4) via a storage interface 404. The storage interface 404 may connect to a memory 405 which may be, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described herein. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT®WINDOWS® (XP®, VISTA®/7/8, 10, 11 etc.), APPLE®IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. The computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. A computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory mediums. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the present disclosure provides a Light-Weight Garbage Collector (LWGC) for dynamically managing memory leaks in resource-constrained Real-Time Operating System based embedded systems using linear/flat memory models.

In an embodiment, the proposed LWGC or garbage collection system may be dynamically triggered to identify and release memory leaks in the runtime of the embedded system, and may thereby ensure that the embedded systems do not run out of memory and system crashes are avoided. Further, the operation of the LWGC may be scheduled to take place in the system idle state, so that the scanning of references for the allocated blocks will not cause any system overhead/power consumption issues.

In an embodiment, the proposed LWGC/garbage collection system may be used as a replacement for traditional garbage collectors, which are not suitable for RTOS based embedded systems due to their heaviness in terms of memory and processing requirements.

In an embodiment, the proposed LWGC uses relationships between memory allocations and memory blocks (i.e., UFI parameters) for determining memory leaks in the system, and thereby avoids possibility of any overhead due to analysis of memory statistics of upper layers.

In an embodiment, the proposed LWGC analyzes memory address information in the IPC and API parameters, considers them as still active and removes them from the PLCL, which may further reduce and optimize the "what to search" and "where to search" space.

As stated above, it shall be noted that the method and the garbage collection system of the present disclosure may be used to overcome various technical problems related to managing and handling memory leaks in RTOS based embedded systems. Specifically, the method and the light-weight garbage collector disclosed herein aims to reduce overhead on the already resource-constraint embedded systems while effectively identifying and releasing the memory leaks in the system. In other words, the disclosed method and the garbage collection system have a practical application and provide a technically advanced solution to the technical problems associated with the existing garbage collection mechanisms.

The aforesaid technical advancement and practical application of the proposed method may be attributed to the aspects of a) identifying one of the one or more UFIs having highest accumulated memory size and adding each of the plurality of memory allocations in the identified one of the one or more UFIs into a Potential Leak Candidate List (PLCL) and b) identifying the memory leaks in the memory unit by identifying unreferenced memory addresses associated with the plurality of memory allocations in the PLCL, as disclosed in steps 2 and 3 of the independent claims 1 and 11 of the present disclosure.

Based on at least the technical advancements provided by the disclosed method and the garbage collection system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. For example, a variety of optional components are described to illustrate the wide variety of possible embodiments of the invention.

When a single device or article is described herein, it will be clear that more than one device/article may be used in place of a single device/article. Similarly, where more than one device/article is described herein, it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention do not necessarily need to include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for managing memory leaks in a memory device, the method comprising:
   grouping, by a garbage collection system, a plurality of similar memory allocations of the memory device into one or more Unique Fixed Identifiers (UFIs);
   identifying, by the garbage collection system, one of the one or more UFIs having a highest accumulated memory size and adding each of the plurality of memory allocations in the identified one of the one or more UFIs into a Potential Leak Candidate List (PLCL);
   identifying, by the garbage collection system, the memory leaks in the memory device by identifying unreferenced memory addresses associated with the plurality of memory allocations in the PLCL; and
   releasing, by the garbage collection system, memory allocations of the memory device associated with the memory leaks.

2. The method of claim 1, wherein the plurality of similar memory allocations is grouped into the one or more UFIs based on a filename of the respective memory allocation, line number corresponding to the respective memory allocation, size of the respective memory allocation, predefined range of memory stack addresses or a Link Register (LR) or Program Counter (PC) associated with a malloc caller corresponding to the respective memory allocation.

3. The method of claim 1, further comprising:
   selecting an alternative UFI having a subsequent highest accumulated memory size, for identifying the memory leaks, when the identified one of the one or more UFIs does not comprise the memory leaks.

4. The method of claim 3, wherein a plurality of successive alternative UFIs is selected for identifying the memory leaks, and for releasing memory allocations of the alternative UFIs corresponding to the memory leaks, until a predefined threshold memory size is available on the memory device.

5. The method of claim 1, wherein identifying the memory leaks further comprises eliminating active memory addresses corresponding to a frequently used generic set of Application Programming Interface (API) parameters.

6. The method of claim 5, wherein identifying the memory leaks further comprises identifying the active memory addresses and a UFI corresponding to the active memory addresses during an Inter Process Communication (IPC).

7. The method of claim 1, wherein information related to each of the one or more UFIs and the identified memory leaks is stored in a non-volatile memory, and wherein the stored information is used to identify potential memory leaks during subsequent rebooting of a device comprising the garbage collection system.

8. The method of claim 7, wherein the information stored in the non-volatile memory is reset as a result of a system update or a software update.

9. The method of claim 7, further comprising storing process-mapping information corresponding to processes involved in an Inter Process Communication (IPC) in the non-volatile memory.

10. The method of claim 1, wherein the method is initialized when a memory size available on the memory device is less than a predetermined threshold.

11. A garbage collection system for managing memory leaks in a memory device, the garbage collection system comprising:
    a processor; and
    a memory, communicatively coupled to the processor, wherein the memory stores processor-executable instructions, which on execution, cause the processor to:
       group a plurality of similar memory allocations of the memory device into one or more Unique Fixed Identifiers (UFIs);
       identify one of the one or more UFIs having a highest accumulated memory size and adding each of the plurality of memory allocations in the identified one of the one or more UFIs into a Potential Leak Candidate List (PLCL);
       identify the memory leaks in the memory device by identifying unreferenced memory addresses associated with the plurality of memory allocations in the PLCL; and release the memory allocations, corresponding to the memory leaks, into the memory device.

12. The garbage collection system of claim 11, wherein the processor groups the plurality of similar memory allocations into the one or more UFIs based on a filename of the respective memory allocation, line number corresponding to the respective memory allocation, size of the memory allocation, predefined range of memory stack addresses, or a Link Register (LR) or Program Counter (PC) associated with a malloc caller corresponding to the respective memory allocation.

13. The garbage collection system of claim 11, wherein the processor is further configured to select an alternative UFI having a subsequent highest accumulated memory size, for identifying the memory leaks when the identified one of the one or more UFIs does not comprise the memory leaks.

14. The garbage collection system of claim 13, wherein the processor selects a plurality of successive alternative UFIs for identifying the memory leaks and releases the memory allocations corresponding to the memory leaks, until a predefined threshold memory size is available on the memory device.

15. The garbage collection system of claim 11, wherein identifying the memory leaks further comprises eliminating active memory addresses corresponding to frequently used generic set of Application Programming Interface (API) parameters.

16. The garbage collection system of claim 15, wherein identifying the memory leaks further comprises identifying the active memory addresses and a UFI corresponding to the active memory addresses used during an Inter Process Communication (IPC) and limiting the search space of the UFI correspoding to the active memory addresses to private memory blocks of processes involved in the IPC.

17. The garbage collection system of claim 11, wherein the processor stores information related to each of the one or more UFIs and the identified memory leaks in a non-volatile memory, and wherein the information is used to identify potential memory leaks during subsequent rebooting of a device comprising the garbage collection system.

18. The garbage collection system of claim 17, wherein the information stored in the non-volatile memory is reset in response to a system update or a software update.

19. The garbage collection system of claim 17, wherein the processor is further configured to store process-mapping information corresponding to processes involved in an Inter Process Communication (IPC) in the non-volatile memory.

20. The garbage collection system of claim 11, wherein the processor dynamically initiates the garbage collection system when a memory size available on the memory device is less than a predetermined threshold.

* * * * *